Sept. 6, 1966 W. E. NICHOLSON, JR 3,271,693

BAND REJECTION FILTER

Filed Oct. 1, 1962 2 Sheets-Sheet 1

INVENTOR.
WILLIAM E. NICHOLSON, JR.
BY
T. L. Styner
ATTORNEY

Sept. 6, 1966 W. E. NICHOLSON, JR 3,271,693

BAND REJECTION FILTER

Filed Oct. 1, 1962 2 Sheets-Sheet 2

United States Patent Office
3,271,693
Patented Sept. 6, 1966

3,271,693

BAND REJECTION FILTER

William E. Nicholson, Jr., Penfield, N.Y., assignor, by mesne assignments, to the United States of America as represented by the Secretary of the Army Filed Oct. 1, 1962, Ser. No. 227,343
4 Claims. (Cl. 330—84)

This invention relates to band rejection filters and is particularly directed to an active network for passing an unlimited spectrum of frequencies from which is removed a narrow band of frequencies.

In the so-called "notch" filters, complex filter sections are cascaded to pass all frequencies of a spectrum except a predetermined narrow band that must be rejected, or attenuated. Such notch filters usually employ many fixed reactive components, are inflexible in design in that the center frequency and bandwidth of the notch is fixed, and the attenuation rate in terms of decibels per octave is quite modest.

An object of this invention is to provide an improved band rejection filter.

A more specific object of this invention is to provide a band rejection filter, the bandwidth and center frequency of the rejection band being easily adjustable.

The objects of this invention are attained by a coupling transformer having a primary and a secondary winding. A tap to an intermediate point on the primary winding is connected to a reference potential, such as ground, and one terminal of the primary winding is connected to the signal source to induce in the transformer windings substantially undistorted all of the spectrum frequencies of the signal source. To the other terminal of the primary winding is connected a band-pass filter, the amplitude of the pass band being balanced with respect to the amplitude of the spectrum frequencies so as to induce counter E.M.F.'s in the windings and neutralize or cancel all frequency components of the pass band. Preferably, the band-pass filter comprises a linear amplifier with a feedback circuit containing a resonant circuit tuned to the center frequency of the band to be passed. By adjusting the amplitude of the regenerated frequencies, the Q of the amplifier is changed and the width of the bandpass is controlled. By retuning the resonant circuit, the center frequency of the pass band is shifted, and the notch in the output circuit is shifted.

Other objects and features of this invention will become apparent to those skilled in the art by referring to specific embodiments of the invention described in the following specification and shown in the accompanying drawing in which.

Figure 1:
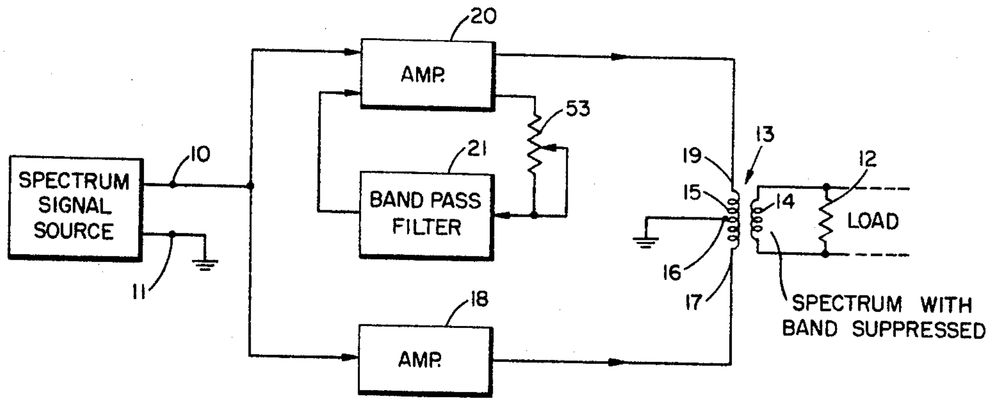
FIG. 1 shows a block diagram of the band rejection filter of this invention.

Input terminals 10 and 11, in FIG. 1, are connected to a source of signals, the frequencies of which may extend over a broad spectrum. To the load 12 is applied the entire spectrum with, however, a predetermined band being completely eliminated from some portion of the spectrum. Transformer 13 comprises secondary winding 14 and primary winding 15. An intermediate tap connection 16 is made to the primary winding; and where the input signal voltage is referred to ground, the tap 16 is connected to a ground reference potential. To terminal 17 of the primary winding is applied the entire spectrum of frequencies. Preferably, the voltage at terminal 17 is amplified in amplifier 18, the gain of which may be controlled. To the other terminal 19 of the primary winding is applied a portion only of the spectrum frequencies. The portion corresponds to the band of frequencies to be rejected. The voltage at terminal 19 is also amplified, as in amplifier 20, the gain of which may be regulated. The phase shift in the two amplifiers is kept as nearly equal as possible.

According to an important feature of this invention, amplifier 20 is frequency-selective, frequency selection being accomplished by the band-pass filter 21 connected in a regenerative feedback circuit in the amplifier. The amount of energy fed back is controlled, as by potentiometer 53, to regulate the effective Q of amplifier 20. As the amplitude of the regenerative feedback energy is adjusted toward a maximum, just short of self-oscillation, the Q of the amplifier increases to a high value and the pass band of the amplifier becomes very narrow. Conversely, by adjusting the regenerative feedback to some low level, the Q of the amplifier is reduced and the pass band is broadened. As the width of the pass band is changed, fine adjustment of the relative gains of the amplifiers 18 and 20 may be made to precisely balance the voltages at terminals 17 and 19 to reject the pass bands from the load circuit.

Figure 2:
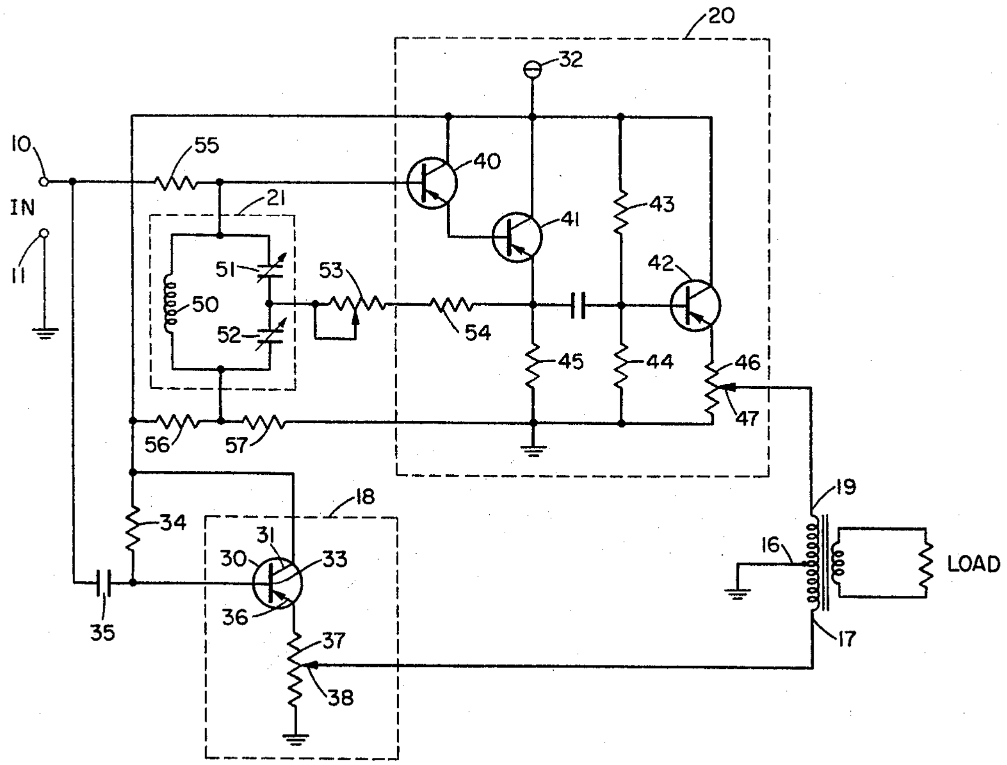
FIG. 2 is a schematic circuit diagram of the filter system of FIG. 1.

In FIG. 2 is shown one specific circuit of this invention. Input terminal 10 is coupled to the inputs of both amplifiers 18 and 20. Amplifier 18, in the example shown, includes the transistor 30 of the PNP type with the collector 31 connected directly to the negative terminal 32 of a D.C. power source. The base 33 is connected through the biasing resistor 34 to the negative terminal 32 and is also coupled to the input terminal 10 through coupling condenser 35. In the emitter-follower configuration shown, emitter 36 is connected to ground through the load resistor 37 to which is applied the sliding contact 38 for regulating the power output or gain of the amplifier 18. Sliding contact 38 is connected directly to the terminal 17 of the output transformer.

Amplifier 20, in the example shown, comprises transistors 40, 41 and 42 coupled in cascade between the input terminal 10 and the output transformer terminal 19. Transistors 40, 41 and 42 are also of the PNP type and are energized by the D.C. power at terminal 32. Biasing resistors 43, 44, 45 and 46 establish optimum biases to the transistors. Resistor 46 has a sliding contact 47 to regulate the amplitude of the signal applied to terminal 19 of the output transformer.

The filter 21 comprises, in the example shown, the parallel resonant tank circuit including coil 50 across series-connected tuning condensers 51 and 52. The tuned circuit is coupled across the input to amplifier 20 so that the amplifier will selectively pass the frequencies to which tank circuit 21 may be tuned. The Q of this circuit is multiplied by feeding back signal energy from the output of transistor 41 to an intermediate point on the tank circuit. The specific feedback connection shown includes adjustable resistors 53 and 54, one of which is adjustable to regulate the amount of feedback energy. As explained in the copending application Serial No. 220,696, filed August 31, 1962, and now abandoned by the same inventor, and assigned to the assignee of this application, the amplifier 20 with its feedback circuit resembles a Colpitts oscillator, although the energy fed back must be insufficient to start and maintain oscillations. As the amount of energy fed back is increased, the apparent impedance across the input to the amplifier 20 at the resonant frequency may be made to approach a high value. That is, the recirculating signal energy is frequency-selected and reselected by the resonant circuit and the effective Q of the amplifier may be made very high.

Isolating resistor 55 in series with the input circuit minimizes loading of the spectrum source, while resistors 56 and 57 establish the bias on the base of transistor 40.

Figure 3:
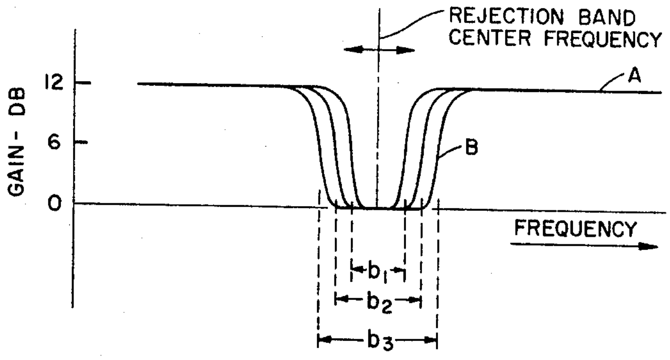
FIG. 3 shows the output characteristics of the filter of FIG. 1.

It will be observed now that adjustable potentiometers 37 and 46 will, respectively, adjust the amplitudes of the signal voltages at terminals 17 and 19, and that adjustable resistor 53 will adjust the width of the pass band. It is to be expected that as Q is changed, the signal voltage at terminal 19 will change, requiring adjustment of one or both of the volume control potentiometers 37 and 46, to rebalance the cancellation circuit. Adjustability of the resonant frequency of tank circuit 21 will adjust the center frequency of the band to be rejected. As shown in FIG. 3, the spectrum frequencies A are relayed to the load circuit, with substantially uniform amplitude, while the band of frequencies B within the spectrum is effectively attenuated. The widths, $b_1$, $b_2$ or $b_3$, of band B are determined by the Q of the amplifier, as explained. The center frequency of the rejection band may be shifted to the right or left merely by tuning the resonant tank circuit.

The band rejection filter of this invention is simple in construction, reliable in operation, and is completely flexible in the matter of bandwidth and center frequency control. Many modifications may be made in the specific circuits of this invention without departing from the scope of the invention as defined in the appended claims.

What is claimed is:

1. A band rejection filter comprising a source of a relatively broad band of signal frequencies, an output coupling transformer, the primary winding of said transformer being center tapped, an untuned amplifier coupled between said source and one terminal of said primary winding, a tuned amplifier coupled between said source and the other terminal of said primary winding, said tuned amplifier comprising a resonant circuit coupled across the input of the amplifier, a feedback circuit coupled between the output of said tuned amplifier and an intermediate point on said resonant circuit for regeneratively recirculating selected frequencies of said spectrum for increasing the selectivity, Q, of said amplifier.

2. The band rejection filter defined in claim 1 further comprising an adjustable impedance in said feedback circuit for adjustably controlling the Q of said amplifier and for regulating the width of the rejection band.

3. The band rejection filter defined in claim 1 further comprising amplitude adjusting means in circuit, respectively, with said tuned amplifier and with said untuned amplifier for balancing the voltage output of said tuned amplifier against the voltage output of said untuned amplifier in said transformer and for cancelling in the transformer the frequency components of the band passed by said tuned amplifier.

4. A band rejection filter comprising a source of a relatively broad spectrum of frequencies, a load circuit, an output coupling means coupled to said load circuit, a first amplifier, said first amplifier being untuned and coupled between said source and said coupling means for applying substantially unattenuated all spectrum frequencies of said source to said load circuit, a second amplifier, said second amplifier being tuned to pass a selected band of frequencies within said spectrum and being coupled between said source and said coupling means, said coupling means being adapted to combine in phase opposition the signal voltages from the outputs of both of said amplifiers, means connected to the second amplifier for changing the Q of said second amplifier, and means connected to an output of at least one of the amplifiers for adjusting the relative amplitudes of outputs of said amplifiers so as to cancel in said load circuit the frequencies of said band.

References Cited by the Examiner

UNITED STATES PATENTS

| | | | |
|---|---|---|---|
| 2,653,194 | 9/1953 | Lyons | 330—126 |
| 2,737,628 | 3/1956 | Haines | 333—126 X |
| 2,964,712 | 12/1960 | Dean et al. | 330—124 |

ROY LAKE, *Primary Examiner.*

T. M. WEBSTER, J. B. MULLINS, *Assistant Examiners.*